(12) United States Patent
Lindoff et al.

(10) Patent No.: US 11,958,375 B2
(45) Date of Patent: Apr. 16, 2024

(54) HANDLING SURPLUS AND/OR DEFICIT OF ENERGY IN LOCAL ENERGY SYSTEMS

(71) Applicant: E.ON SVERIGE AB, Malmo (SE)

(72) Inventors: Bengt Lindoff, Bjarred (SE); Jacob Skogstrom, Lomma (SE); Per Rosen, Lund (SE)

(73) Assignee: E.ON SVERIGE AB, Malmo (SE)

( * ) Notice: Subject to any disclaimer, the term of this patent is extended or adjusted under 35 U.S.C. 154(b) by 748 days.

(21) Appl. No.: 17/052,086

(22) PCT Filed: Apr. 26, 2019

(86) PCT No.: PCT/EP2019/060719
§ 371 (c)(1),
(2) Date: Oct. 30, 2020

(87) PCT Pub. No.: WO2019/211184
PCT Pub. Date: Nov. 7, 2019

(65) Prior Publication Data
US 2021/0245617 A1    Aug. 12, 2021

(30) Foreign Application Priority Data
Apr. 30, 2018 (EP) ..................................... 18170081

(51) Int. Cl.
*B60L 53/63* (2019.01)
*B60L 55/00* (2019.01)
(Continued)

(52) U.S. Cl.
CPC ............... *B60L 53/63* (2019.02); *B60L 55/00* (2019.02); *H02J 3/322* (2020.01); *H02J 3/381* (2013.01);
(Continued)

(58) Field of Classification Search
CPC ........... H02J 13/00012; H02J 13/00022; H02J 2300/28; H02J 2300/24; H02J 3/322; B60L 53/63; B60L 55/00
(Continued)

(56) References Cited

U.S. PATENT DOCUMENTS

2009/0040029 A1    2/2009  Bridges et al.
2009/0313103 A1    12/2009 Ambrosio et al.
(Continued)

FOREIGN PATENT DOCUMENTS

CN    102437584 A    5/2012
CN    103915869 A    7/2014
(Continued)

OTHER PUBLICATIONS

International Search Report and Written Opinion of PCT/EP2019/060719, dated Jun. 4, 2019, in 12 pages.
(Continued)

*Primary Examiner* — Nathaniel R Pelton
(74) *Attorney, Agent, or Firm* — Knobbe, Martens, Olson & Bear, LLP

(57) ABSTRACT

A method for handling surplus or deficit of energy in local energy systems (30) is presented. The method comprising; determining an accumulator status based on data pertaining to an accumulator (20) of a moveable device (10); determining energy status of each of a plurality of local energy systems (30) based on data pertaining to the respective local energy system 30; scoring, based on the determined accumulator status and the determined energy statuses, each of the local energy systems (30); determining, based on the respective scores of each of the plurality of local energy systems (30), a local energy system (30), among the plurality of local energy systems (30), to which the moveable device (10) is to be directed. Also a server (40) configured to
(Continued)

handling surplus or deficit of energy in local energy systems is presented.

16 Claims, 3 Drawing Sheets

(51) Int. Cl.
  *H02J 3/32* (2006.01)
  *H02J 3/38* (2006.01)
  *H02J 13/00* (2006.01)
(52) U.S. Cl.
  CPC .. *H02J 13/00002* (2020.01); *H02J 13/00012* (2020.01); *H02J 13/00022* (2020.01); *H02J 13/00004* (2020.01); *H02J 2300/20* (2020.01); *H02J 2300/22* (2020.01); *H02J 2300/24* (2020.01); *H02J 2300/28* (2020.01); *H02J 2310/48* (2020.01)
(58) Field of Classification Search
  USPC .......................................................... 320/109
  See application file for complete search history.

(56) References Cited

U.S. PATENT DOCUMENTS

| | | | |
|---|---|---|---|
| 2011/0276194 A1 | 11/2011 | Emalfarb et al. | |
| 2012/0245750 A1* | 9/2012 | Paul | H02J 3/003 700/291 |
| 2012/0249068 A1* | 10/2012 | Ishida | B60L 55/00 320/109 |
| 2015/0295565 A1* | 10/2015 | Maeda | H03K 3/011 377/67 |
| 2015/0298565 A1 | 10/2015 | Iwamura et al. | |
| 2015/0345962 A1 | 12/2015 | Graham | |
| 2016/0221453 A1 | 8/2016 | Bridges et al. | |
| 2016/0280089 A1* | 9/2016 | Uyeki | B60L 53/63 |
| 2017/0259683 A1 | 9/2017 | Shimizu et al. | |
| 2021/0245617 A1 | 8/2021 | Lindoff et al. | |

FOREIGN PATENT DOCUMENTS

| | | | |
|---|---|---|---|
| CN | 104103862 A | | 10/2014 |
| DE | 102015201810 | * | 8/2016 |
| DE | 102016212026 | | 1/2018 |
| DE | 102017113845 | | 12/2018 |
| JP | 2012048286 | | 3/2013 |
| JP | WO2014/033944 | | 8/2016 |
| WO | WO 2014/033944 A1 | | 3/2014 |
| WO | WO 2014/146727 | | 9/2014 |
| WO | WO 2017/076868 | | 5/2017 |

OTHER PUBLICATIONS

International Search Report and Written Opinion of PCT/EP2019/060768, dates Apr. 6, 2018, in 12 pages.

* cited by examiner

HANDLING SURPLUS AND/OR DEFICIT OF ENERGY IN LOCAL ENERGY SYSTEMS

FIELD OF INVENTION

The invention relates to handling surplus and/or deficit of energy in local energy systems.

The invention also relates to a server configured to handle surplus and/or deficit of energy in local energy systems.

TECHNICAL BACKGROUND

Increasingly, electrical energy is generated in local energy systems. Examples of local energy systems are solar panels and windmills. Such local energy systems will increase the power production variations over time, not only season wise, but also over the day. This for example due to the variations of sun and wind. Due to the variations, sometimes there will be a surplus of energy at a specific local energy system and sometime there will be a deficit of energy at that specific local energy system. Thus, there exists a need for handling surplus or deficit of energy in a local energy system.

SUMMARY OF INVENTION

In view of the above, it is an object of the present invention to provide means for handling surplus or deficit of energy in local energy systems.

According to a first aspect a method for handling surplus or deficit of energy in local energy systems is provided. The method comprising:

determining an accumulator status based on data pertaining to an accumulator of a moveable device;

determining energy status of each of a plurality of local energy systems based on data pertaining to the respective local energy system;

scoring, based on the determined accumulator status and the determined energy statuses, each of the local energy systems; and determining, based on the respective scores of each of the plurality of local energy systems, the local energy system, among the plurality of local energy systems. The determined local energy system may be a local energy system to which the moveable device is to be directed.

In connection with the present disclosure the term "energy status of the local energy system" is to be understood as a status of a local energy system in connection with energy, i.e. if the local energy system is in need of energy or has excess energy available. Possibly the energy status of the local energy system is also indicative of how much energy is needed or available. Possibly the energy status of the local energy system is also indicative of when the energy is needed or available.

In connection with the present disclosure the term "accumulator status" is to be understood as a status of an accumulator in connection with energy, i.e. if the accumulator is in need of energy or has excess energy available. Possibly, the status of the accumulator is also indicative of a current state of charge of the accumulator together with a minimum and/or a maximum state of charge of the accumulator. Possibly, the status of the accumulator is also indicative of a desired state of charge of the accumulator Possibly, e status of the accumulator is also indicative of a point in time when the desired state of charge is to be reached.

In this way, a moveable device in need of charging may be selected to be directed to and recharge at a local energy system currently experiencing a surplus of generated energy. Moveable devices traditionally being powered by burning fossil fuel in an engine are increasingly, instead or in addition, being powered by electrical motors. Hence, the moveable device may be propelled by an electric motor. Non-limiting examples of such movable devises are cars, busses, trucks, drones, robots, lawn mowers, boats, airplanes, and helicopters. The energy for powering the electrical motor is typically stored in an accumulator of the moveable device. According to a non-limiting example, the accumulator may be a battery. The battery may electrochemically store electrical power. According to a non-limiting example, the accumulator may be a hydrogen tank. The hydrogen tank may store hydrogen that later may be transformed into electrical power at a fuel cell. Similarly, if the local energy system is currently experiencing a deficit, i.e. not generating enough energy for some reason, a moveable device may be directed to and discharge some energy to the local energy system. In this way, local energy systems can handle an excess or deficit of energy by utilizing activity of moveable devices in their area, synergizing with these moveable devices expected behavior to stop for charging or other reasons. By matching the accumulator status, and possibly other needs, of a moveable device towards current local energy system needs, energy supply and demand may be matched on a local scale. This may reduce the need for stationary accumulators at the respective local energy system. Such stationary accumulators at the respective local energy system would otherwise be needed in order to store surplus energy in times of surplus energy production at the local energy system to be used at times of deficit in the energy production at the local energy system.

Including a maximum, minimum, and/or a current state of charge may enable a more informed estimation of the needs of the moveable device vis-a-vis those of potentially suitable local energy systems.

The data pertaining to the accumulator may comprise a desired state of charge of the accumulator. In this way, the moveable device may charge or discharge as needed at a local energy system while still enabling the accumulator to have a desired state of charge when the moveable device is again activated for movement. For instance, it may be known that a typical usage of a moveable device only requires a portion, e.g. half, of the available maximum capacity of the accumulator. The moveable device may hence discharge any energy in excess of this portion to a local energy system in need of energy. By knowing desired state of charge, a better match implying a better match of energy supply and demand between the movable device and the plurality of local energy systems may be found. In this way less overall energy may be wasted.

The desired state of charge may comprise an interval of states of charge. In this way, the device may charge/discharge to a point within its desired state-of-charge interval chosen such that needs of the local energy system providing/absorbing the energy are more closely met. Thus, the needs of a local energy system may be more optimally weighed against the needs of the moveable device.

The act of scoring each of the local energy systems may comprise estimating an energy cost for moving the movable device to the respective local energy system. In this context, the act of moving the moveable device refers to transporting the moveable device to the respective local energy system. The act of moving may comprise one or more of driving, flying, propelling, or any other active way of transporting the moveable device to the respective local energy system. In this way, local energy systems which would be e.g.

unreachable by the moveable device may be disqualified from consideration. Local energy systems which are in reach but which are so close that the accumulator of the moveable device would not charge enough for a stop to be efficient might similarly be disqualified from consideration. Furthermore, the time to be spent at the local energy system by the charging/discharging moveable device may be more closely optimized to the needs of the moveable device.

The data pertaining to the accumulator may comprise a desired time of operation of the moveable device comprising the accumulator. The desired time of operation may comprise a start time of the time of operation. The desired time of operation may comprise an end time of the time of operation. The start time of operation may be expressed as a departure time from the local energy system. For example, an electric vehicle may want to leave a local energy system when the owner of the electric vehicle returns e.g. after work.

Further, the act of scoring each of the local energy systems may comprise a desired arrival time of the movable device to the respective local energy system.

The data pertaining to the respective local energy system may comprise a current movable device occupancy capacity of the local energy system. This enables for the scoring process to estimate whether the moveable device will be able to be accommodated for charging/discharging at a local energy system, and recommend against a local energy system which is or will likely be at capacity upon arrival. Furthermore, it allows the scoring process to more evenly spread the charging/discharging duties of local energy systems which may have a high probability of being empty of moveable devices.

The data pertaining to each respective local energy system may pertain to an amount of energy available for transfer to the accumulator the movable device from the respective local energy system. This allows for selection of local energy systems which may be in need of getting rid of energy and thus in greater need of a charging moveable device. Conversely, it may dissuade from directing a moveable device in need of charging to a near empty local energy system. The data pertaining to the respective local energy system may pertain to a time period of availability of the energy. This enables more informed planning of charging/discharging activities of moveable devices. For instance, a local energy system based on solar panels may not be suitable for charging activities at night. The time period of availability may be measured on a scale of hours or part of a day.

The data pertaining to each respective local energy system may pertain to an energy need of the respective local energy system, i.e. an amount of energy needed at the local energy system. This allows for selection of local energy systems which may be in need of energy and thus in greater need of a discharging moveable device. The data pertaining to the local energy system may pertain to a time period of the need of the energy.

By knowing a current excess or deficit of energy in the local energy systems, a better match of energy supply and demand between the movable device and the plurality of local energy systems may be made. In this way less overall energy may be wasted.

The method may further comprise directing the movable device to the determined local energy system.

Each local energy system may be associated with a geographical position.

The method may further comprise determining navigational data pertaining to the geographical position of the determined local energy system to which the movable device is to be directed and to a current geographical position of the movable device, and the act of directing the movable device may comprises providing the navigational data to a navigator of the movable device. This enables navigation of the moveable device to the local energy system. This may be necessary in order for autonomous moveable devices to ambulate to a local energy system, and/or helpful for a human operator.

The local energy system may comprise one or more of the following: a solar panel, a wind turbine, a thermal energy generator, a moveable device comprising an accumulator, a district heating system, a district cooling system or a shared heating and cooling thermal system, such that Ectogrid™, see e.g. WO 2017/076868. The local energy system may be a solar panel park comprising a set of solar panels. The local energy system may be a wind turbine park comprising a set of wind turbines. A local energy system is to be seen as an energy system that is locally producing and/or locally using energy. In this context locally shall be construed as being within a limited space. For example, a local energy system may be arranged in a vehicle, in house, in a block of houses or in a district of a city. According to a non-limiting example, a local energy system is an energy system that is configured to mainly produce energy locally and to locally consume the locally produced energy. Hence, the produced energy is preferably consumed at the same place as it is produced. However, at some time instances such a local energy system may need extra energy or may need to get rid of excess energy. The present invention provides means for this.

The method may further comprise setting a geographical area to within which the movable device is planning to move and determining the plurality of local energy systems to be scored based on the geographical area and the geographical positions or the local energy systems. This may facilitate planning ahead of time for charging/discharging of moveable devices which may have a long range.

According to a second aspect a server configured to handle surplus or deficit of energy in local energy systems is provided. The server comprising:
  a receiver configured to receive data pertaining to an accumulator of a moveable device and to receive data pertaining to each of the local energy systems; and
  a control circuit configured to:
    determine, using an accumulator determining function, an accumulator status, wherein the accumulator status is based on the data pertaining to the accumulator of the moveable device;
    determine, using a local energy system status determining function, an energy status of each of the local energy systems, wherein each energy status is based on data pertaining to the respective local energy system;
    score, using a guiding function, each of the local energy systems, wherein each score is based on the determined accumulator status and the respective determined energy status; and
    determine, using the guiding function, a local energy system among the plurality of local energy systems to which the moveable device is to be directed, wherein the determination is based on the respective scores of each of the plurality of local energy systems.

Such a server may enable for local energy systems in an area to be placed in contact with the server and use moveable devices passing through the area to regulate their energy needs as described in connection with the method according to the first aspect.

The above mentioned features of the method, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
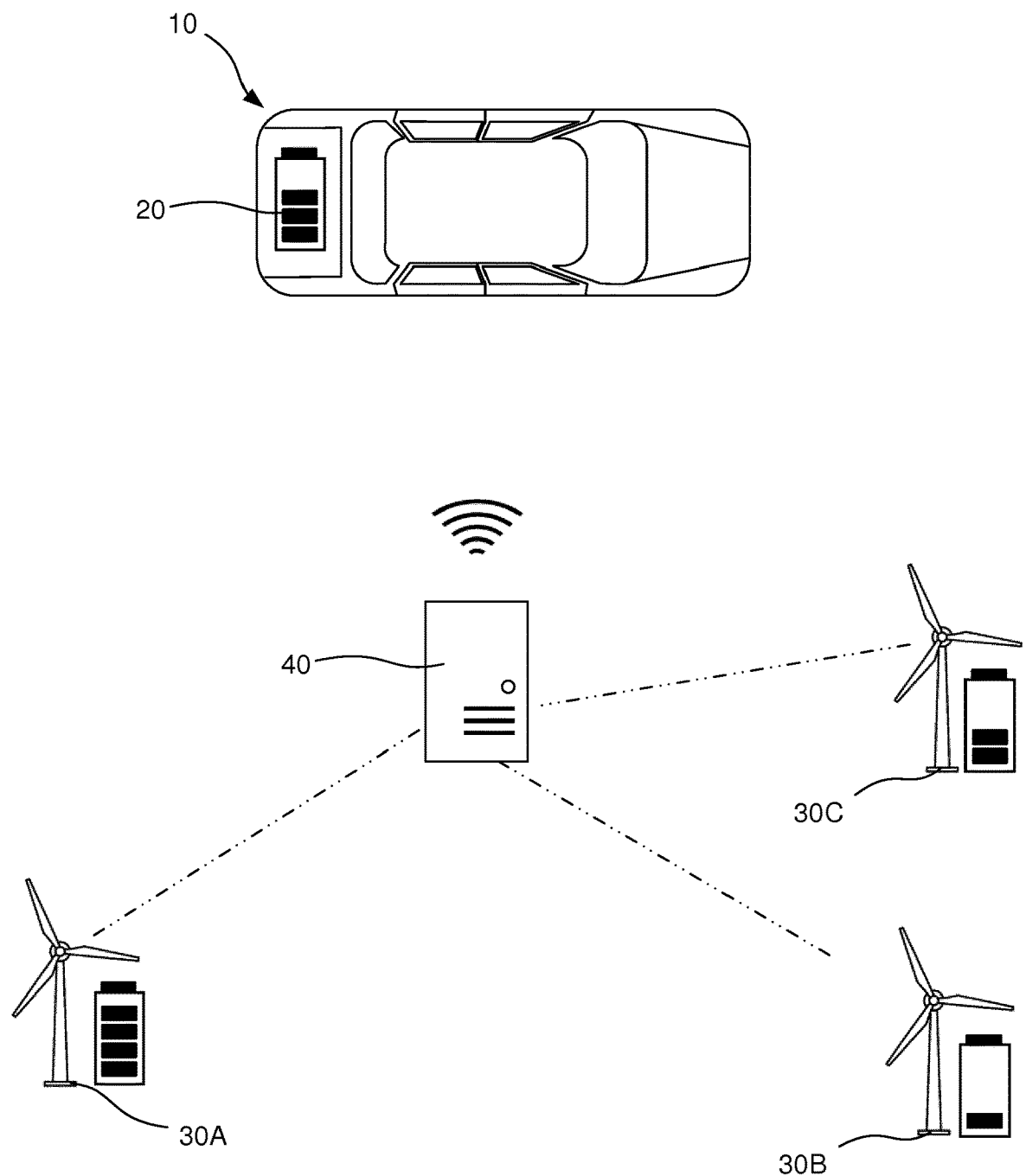
FIG. 1 illustrates a moveable device, a server and several local energy systems interconnected in a communication network.

FIG. 1 illustrates a communication network comprising a moveable device 10, a plurality of local energy systems 30A, 30B, 30C, and a server 40. The moveable device 10, the plurality of local energy systems 30A, 30B, 30C, and the server 40 are configured to communicate with each other. The communication is preferably wireless communication. Such communication is well known to a person skilled in the art and will not be described in any detail herein.

Each of the local energy systems 30A, 30B, 30C is depicted as a wind turbine. It is realized that each local energy system 30A, 30B, 30C may be alternatively or additionally be a solar panel, a thermal energy generator, a district heating system, a district cooling system, a shared heating and cooling systems, or any other system of local generation of energy. When not referring to a specific local energy system 30A, 30B, 30C, the term "local energy system 30" will be used throughout the application. Each local energy system 30 is associated with a geographical position. The geographical position is the position where energy may be extracted from or input to the local energy system 30. The local energy systems 30 may comprise accumulators themselves. The local energy systems 30 need not comprise accumulators, but may instead generate energy, e.g. electricity, only when connected to an energy-consuming device, such as a moveable device 10 or any other kind of energy-consuming device. Excess energy of a local energy system 30 may be stored at an accumulator connected to the local energy system 30. The accumulator connected to the local energy system 30 may be a stationary accumulator belonging to the local energy system. Alternatively, or in combination, the accumulator connected to the local energy system 30 may be an accumulator of a movable device connected to the local energy system 30.

The moveable device 10 is in this case illustrated as an electric car. The electric car is just an example of a moveable device 10. The moveable device 10 may be any device configured to be propelled by an electric motor. Further, non-limiting examples of moveable devices are: busses, trucks, drones, robots, lawn mowers, boats, airplanes, and helicopters. The energy for powering the electrical motor is typically stored in an accumulator 20 of the moveable device 10. According to a non-limiting example, the accumulator 20 may be a battery. The battery may electrochemically store electrical power. According to another non-limiting example, the accumulator may be a hydrogen tank storing hydrogen. The hydrogen may later be transformed into electrical power at a fuel cell. Hence, the accumulator 20 may hold electric power which the moveable device 10 can use for different purposes, such as propelling the moveable device. Further, the accumulator 20 may be configured to be discharged at a local energy system. Many moveable devices comprise accumulators with quite some capacity. For example, electric cars out on the market today may comprise a battery with a capacity in the order of 40-120 kWh. This may be well enough as a backup supply for a local energy system for hours or even days. Especially since some of the electric cars except from having the ability to charge their accumulators also have the ability to discharge their accumulators. The later may be referred to a Vehicular to Grid (V2G) system. Hence, a moveable device 10 comprising a V2G system may not only charge the on board accumulator 20 but also discharge it to a local energy system. Hence, the on board accumulator 20 of the moveable device 10 may be used as back-up accumulator for the local energy system. The moveable device 10 may be associated with a current geographical position. For this each movable device 10 may be equipped with a GPS-unit.

Due to the potential large fluctuations of energy productions in local energy systems, accumulators may be needed. Designing stationary accumulators for worst case scenarios at each local energy system is associated to a cost increasing the overall cost for energy systems. Hence, the V2G system may be possible to use for mitigating the problem that some local energy system has excess and other a deficit of energy at a certain time instant.

Figure 2:
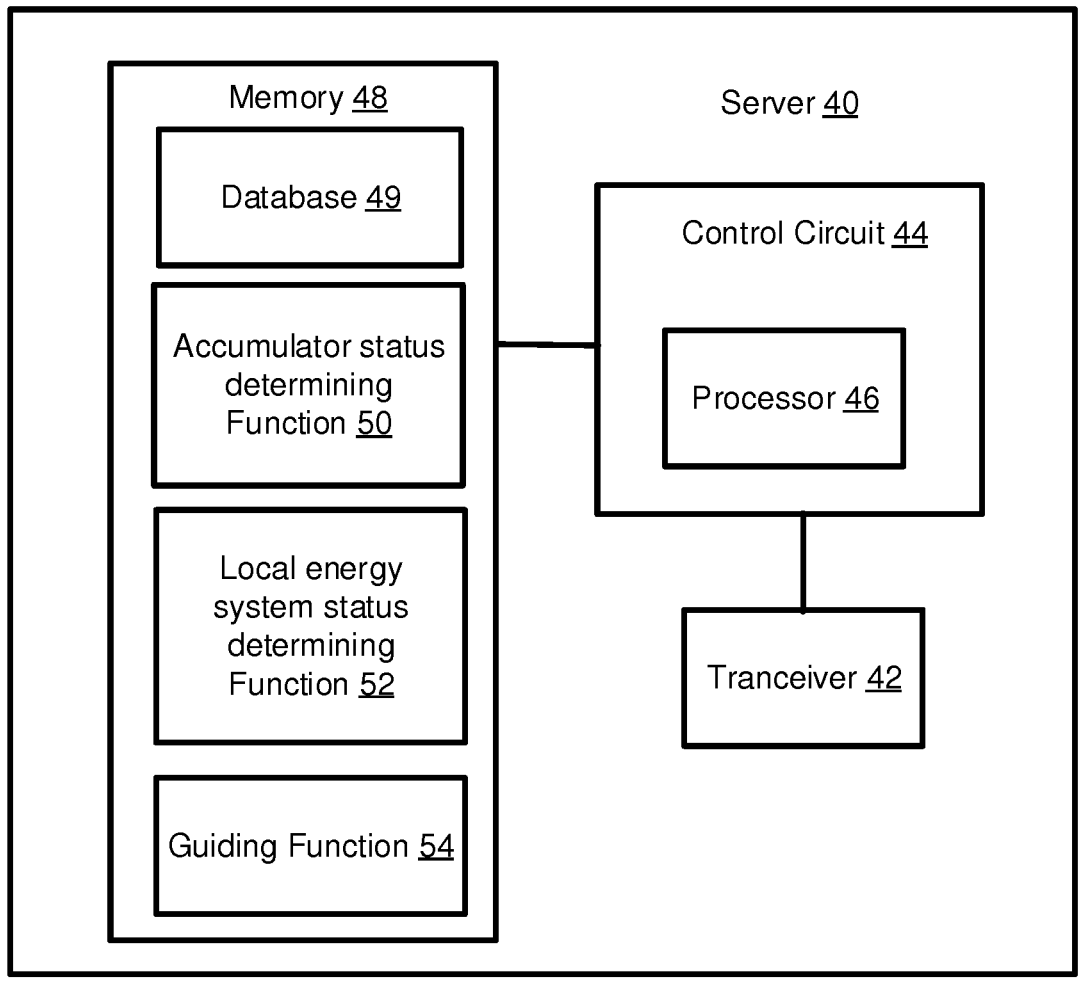
FIG. 2 is a schematic of a server.

A more detailed schematic of the server 40 is schematically shown in connection with FIG. 2. The server 40 comprises a transceiver 42, a control circuit 44 and a memory 48.

The transceiver 42 is configured to communicate with the movable device 10. The transceiver 42 is configured to communicate individually with the plurality of local energy systems 30. Hence, the transceiver 42 enables the server 40 to establish communications with other device, such as the movable device 10 and the plurality of local energy systems 30. That said, each of the plurality of local energy systems 30 and the movable device 10 also comprises a respective transceiver for communicating with the server 40. The communications may include data transfers, and the like. Data transfers may include, but are not limited to, downloading and/or uploading data and receiving or sending messages. The data may be processed by the server 40, the movable device 10 and/or each of the plurality of local energy systems 30. The processing may include storing the data in a memory, e.g. the memory 48 of the server 40, executing operations or function, and so forth.

The control circuit 44 is configured to carry out overall control of functions and operations of the server 40. The control circuit 44 may include a processor 46, such as a central processing unit (CPU), microcontroller, or microprocessor. The processor 46 is configured to execute program code stored in the memory 48, in order to carry out functions and operations of the server 40.

The memory 48 may be one or more of a buffer, a flash memory, a hard drive, a removable media, a volatile memory, a non-volatile memory, a random access memory (RAM), or another suitable device. In a typical arrangement, the memory 48 may include a non-volatile memory for long term data storage and a volatile memory that functions as system memory for the control circuit 48. The memory 48 may exchange data with the control circuit 44 over a data bus. Accompanying control lines and an address bus between the memory 48 and the control circuit 44 also may be present.

Functions and operations of the server 40 may be embodied in the form of executable logic routines (e.g., lines of code, software programs, etc.) that are stored on a non-transitory computer readable medium (e.g., the memory 48) of the server 40 and are executed by the control circuit 44 (e.g., using the processor 46). Furthermore, the functions and operations of the server 40 may be a stand-alone software application or form a part of a software application that carries out additional tasks related to the server 40. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 44 may execute an accumulator status determining function 50. The accumulator status determining function 50 may be configured to determine an accumulator status of the accumulator 20 of the moveable device 10. The accumulator status determining function 50 may be configured to determine the accumulator status based on one or more of the following data pertaining to the accumulator 20 of the moveable device 10:

a current state-of-charge (SOC) of the accumulator 20;

a maximum or minimum SOC possible for the accumulator 20;

a voltage tolerance when charging the accumulator 20;

a geographical area the moveable device 10 request to park on, for instance within certain blocks, urban district, suburbs, etc.;

an accumulator size, e.g. measured in kWh;

an indication whether the accumulator is required for be charged, if the SOC is low, for instance below 10%; and an indication whether the accumulator is allowed to be discharged, and in that case, possibly also an indication about how much discharge that is allowed, for example down to a SOC of 60%.

One of more of the above data pertaining to the accumulator 20 for the moveable device 10 may be retrieved from the moveable device 10. For example, the current SOC of the accumulator 20. Alternatively, or in addition, one of more of the above data pertaining to the accumulator 20 for the moveable device 10 may be stored in a database 49 stored in the memory 48. For example, the maximum or minimum SOC possible for the accumulator 20 or the voltage tolerance when charging the accumulator 20. Each entry of the database may be linked to an ID for the accumulator 20 and/or for the moveable device 10. The ID for the accumulator may be an ID for a specific type of accumulator 20. The ID for the accumulator may be an ID unique for each specific accumulator 20. The ID for the moveable device 10 may be an ID for a specific type of moveable device 10. The ID for the moveable device 10 may be an ID unique for each specific moveable device 10. The database 49 does not need to be stored locally at the server 40. Hence, the database 49 may e.g. be a distributed database compiled using cloud computing. One of more of the above data pertaining to the accumulator 20 may be measured in real-time. One of more of the above data pertaining to the accumulator 20 may be pre-determined. The accumulator status of the accumulator 20 of the moveable device 10 may be an indication of need for the accumulator 20 to be charged or for the accumulator 20 to get rid of energy.

The accumulator status may also be based on additional information. For example, a price level, i.e. maximum allowed price for charging the accumulator, or request for negative price in case of discharge. The additional information may also comprise a request including a time aspect, i.e. of type "at time X, the SOC need to be at least Y".

The control circuit 44 may execute a local energy system status determining function 52. The local energy system energy status determining function 52 may be configured to determine an energy status of each of the plurality of local energy systems 30. The local energy system energy status determining function 52 may be configured to determine the energy status of a local energy system 30 based on one or more of the following data pertaining to the local energy system 30:

a location (geographical position) of the local energy system;

information pertaining to excess or deficit of energy and possible also a measure of how large the excess or deficit of energy is;

information pertaining to when the energy is available or needed and for how long:

a price offer (price per kWh), such a price offer may be negative or positive depending excess or deficit of energy;

a current capacity to accommodate moveable devices 10;

a minimum/maximum charging power; and a time of availability of the local energy system 30—for instance, the local energy system 30 may be housed in a parking garage with closing hours.

One of more of the above data pertaining to the local energy system 30 may be retrieved from the local energy system 30. For example, information pertaining to excess or deficit of energy and possible also a measure of how large the excess or deficit of energy is; information pertaining to when the energy is available or needed and for how long; the price offer (price per kWh), such a price offer may be negative or positive depending excess or deficit of energy; or the current capacity to accommodate moveable devices 10. Alternatively, or in addition, one of more of the above data pertaining to the local energy system 30 may be stored in the database 49. For example, the minimum/maximum charging power; or the time of availability of the local energy system 30. Each entry of the database 49 may be linked to an ID for the local energy system 30. One of more of the above data pertaining to the local energy system 30 may be measured in real-time. One of more of the above data pertaining to the local energy system 30 may be pre-determined. The energy status of each one of the plurality of local energy systems 30 may be an indication of a need for the local energy system 30 to get rid of energy or a need for the local energy system 30 to get energy. In particular, the energy status of each one of the plurality of local energy systems 30 may comprise an amount of energy available for transfer to a moveable device 10 or an amount of energy needed by the local energy system 30.

The control circuit 44 may execute a guiding function 54. The guiding function 54 may be configured to select a local energy system 30 to which the moveable device 10 should be guided. The guiding function 54 may base the selection of one of the plurality of local energy systems 30 to which the moveable device 10 should be guided based on a scoring. The scoring may be configured to compare the energy status of the plurality of local energy systems 30 and the accumulator status of the moveable device 10. The scoring may further be based on other data such as pre-set preferences. The scoring will be discussed in more detail below and will also be exemplified with some examples. The guiding function 54 may further comprise a comparator. The comparator is configured to compare the scores and select at least one local energy system 30 based on the scores. The comparator may be configured to select one specific local energy system 30 having e.g. the best score. The comparator may be configured to select a sub-set of local energy systems 30 having scores above a threshold.

The guiding function 54 may further comprise sending direction instructions to the moveable device 10. The direction instructions may comprise a geographical position to the selected one or more local energy system 30. The direction instructions may comprise an identifier for the selected local energy system 30, At the moveable device 10 an operator or a navigational computer can then decide how to travel to the local energy system 30. The guiding function 54 may also be configured to determine geographical data pertaining to a geographical position of the selected local energy system 30 and/or of the moveable device 10 and use these to determine navigational data. The navigational data may comprise instructions for the moveable device 10 to reach the selected local energy system 30. The navigational data may then be sent to the moveable device 10. The geographical position may be determined by GPS for the moveable device 10 and/or the local energy systems 30. The geographical position may be pre-determined for the local energy systems 30 and stored in a database 49. The moveable device 10 may be directed by sending said navigational data to a navigator of the moveable device 10. Alternatively, to the above the movable device 10 may be configured to calculate the navigational data based on a position of the selected local energy system 30 and a current position of the moveable device 10.

The guiding function may 54 may further be configured to compile control information associated to the local energy system 30. The control information associated to the local energy system 30 is information pertaining to how to control the moveable device 10 in connection with the selected/determined local energy system 30. The control information may be information pertaining to how to charge/discharge energy to/from the accumulator 20 of the moveable device 10 from/to the selected/determined local energy system 30. The control information may be sent to a charger/discharger at the moveable device 10. Alternatively, or in combination, the control information may be sent to a charger/discharger at the selected/determined local energy system 30.

For example, upon the moveable device 10 is already connected to the selected/determined local energy system 30 or has arrived at the selected/determined local energy system 30 and just being connected thereto, the control information may be sent to the moveable device 10. Hence, the control information may be sent to a charger/discharger of the moveable device 10 upon connection of the moveable device 10 to the local energy system 30. Alternatively, or in connection, control information may be sent to a charger/discharger at the local energy system upon connection of the moveable device 10 to the local energy system 30. The charger/discharger, either arranged at the local energy system 30 or at the moveable device 10, is configured to control charging/discharging of energy to from the movable device 10 connected to a local energy system 30.

Hence, the server 40 may communicate with a plurality of local energy systems, and with a moveable device 10 comprising an on-board accumulator 20. The server 40 determines information associated to accumulator status of the accumulator 20 of the moveable device 10. The accumulator status may pertain to a need of charging the accumulator or if the accumulator may be discharged, i.e. giving away energy. The server 40 further determines information associated to energy status for each of the plurality of local energy systems. The energy status may pertain to excess or deficit of energy at a local energy system. The server 40 may then match the accumulator status toward energy status of the respective local energy system, i.e. the needs of the different local energy systems, do the local energy system need energy or may it get rid of energy. By the matching a set, i.e. one or more, of the local energy systems need fulfilling the moving accumulator need may be determined. Position information for the determined set of local energy system may then be sent to the moveable device 10. Hence, the moveable device 10 may be routed to a local energy system 30 having needs corresponding to the needs of the moveable device 10.

Details of the matching procedures and example embodiments of energy needs are described below.

The data pertaining to the respective local energy system 30 may indicate that out of the plurality of local energy systems 30A, 30B, 30C, the local energy system 30A has a surplus of energy. In this example, an accumulator present at the local energy system 30A is also becoming fully charged and an additional accumulator would be needed at the local energy system 30A in order for the local energy system 30A not needing to shut down energy production. The local energy system 30B also has a surplus, but can store more generated energy at an accumulator present at the local energy system 30B. The local energy system 30C has a deficit of energy, and will soon be out of energy.

According to a first example, the data pertaining to the accumulator 20 of the moveable device 10 may indicate that the moveable device 10 is going to be below a preferred SOC within a certain time frame of use of the moveable device 10. Hence, the moveable device 10 will soon be in need for energy. The scoring of the guiding function 53 may, according to this example, score the local energy system 30A highly, 30B not as highly and 30C the lowest. For example, a scale from 1-10 may be used wherein the local energy system 30A will score a 10, the local energy system 30B will score a 5 and local energy system 30C will score a 1.

On the other hand, the accumulator data may indicate that the moveable device 10 has a surplus of energy. In this case, the local energy system 30C would be scored highly, the local energy system 30B would again be scored in the middle, and 30A would be scored the lowest. For example, a scale from 1-10 may be used wherein the local energy system 30C will score a 10, the local energy system 30B will score a 5 and local energy system 30A will score a 1.

As mentioned above, the data pertaining to the respective local energy system 30 may comprise a time of availability of the local energy system 30, or a capacity to serve the moveable device 10. If the case is that the local energy system 30B is the only local energy system 30 to be able to accommodate the moveable device 10 because the others are closed or already full of other moveable devices 10, the local energy system 30B would be scored the highest. It is of course possible to think of many parameters or desirability for a local energy system 30 or moveable device 10, which the scoring of the guiding function 54 would use to score the local energy systems 30. One such parameter could for example simply be a preference of solar power over wind power, or renewable power over fossil fuel based power.

As seen from these examples, it is possible to direct the moveable device 10 with an on board accumulator 20 to a local energy system 30 based on the respective needs of the moveable device 10 in relation to needs of local energy systems 30. As a development of this concept, it is also possible to set a desired state-of-charge of the moveable device 10. This may be done for many reasons. For example, if the moveable device 10 is an electric vehicle which is fully charged at the owners' home every night and needs half of its maximum SOC to complete a round trip to its owners' workplace, the moveable device 10 may have a 50% SOC set as desirable by the owner. The moveable device 10 could then be used by its owner to travel to work, but be parked at a local energy system 30 near its owners' workplace where excess energy may be discharged to the local energy system 30. Conversely, the owner may want to charge as little as possible at their home, and thus leave home almost empty. The moveable device 10 could then be directed to park at a local energy system 30 with power to spare so that the moveable device 10 may be charged while the owner is at work. The most suitable local energy system 30 might of course not be the same day-to-day. It is also possible for the local energy systems 30 to, based on some parameter such as expected availability of energy, set the desired SOC of the moveable device 10, for instance only admitting it to be charged to 70% if the moveable device 10 has a high maximum SOC and poor circumstances for energy generation are anticipated, e.g. by weather forecast.

It is also possible for the moveable device 10 to have set an interval of desired SOC, e.g. 30%-70% or 20%-50%. If this is done, the guiding function 54 may make a more informed selection of where to direct the moveable device 10. For example: the owner of an electric vehicle wishes to stop at their workplace. The electric vehicle is set to have a desired state of charge of 30%-50% and communicates this to the server 40. The local energy system 30A is at full capacity and the local energy system 30C is nearly empty. The guiding function 54 may now decide that even though the local energy system 30C will be able to provide energy to reach the desired interval of SOC, the local energy system 30A is in greater need of discharge and may be scored higher. Other factors may also of course come into play.

Figure 3:
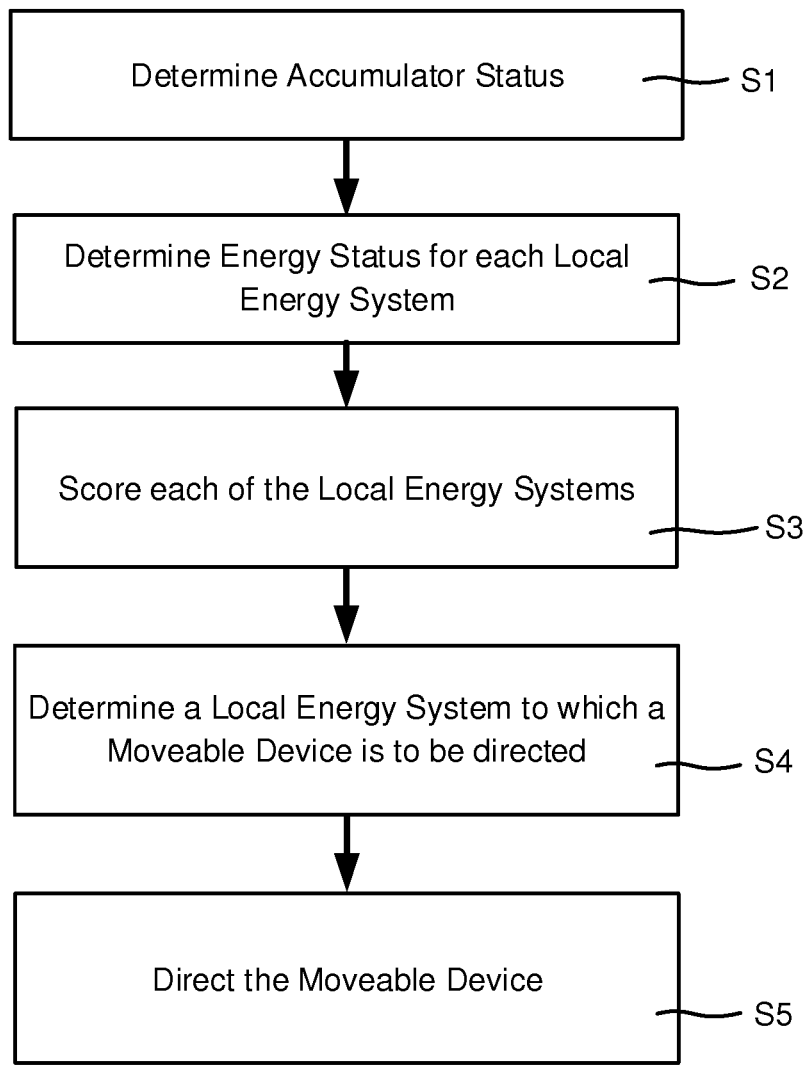
FIG. 3 is a flow diagram of a method for directing a moveable device to a local energy system.

FIG. 3 illustrates a flowchart of a method for handling surplus or deficit of energy in local energy systems 30. The acts of the method may be performed by the functions of the server 40 described above. However, it is equally realized that some or all of the act of the method may be performed by similar functions performed at other devices. The method comprising the following acts. Determining S1 an accumulator status. The accumulator status is determined based on data pertaining to an accumulator 20 of a moveable device 10. The determining S1 may involve pre-determined data pertaining to the accumulator 20. Hence, data that is known beforehand. The determining S1 may involve measured or estimated data pertaining to the accumulator 20. Hence, data that is changing over time. Examples of data pertaining to an accumulator 20 of a moveable device 10 are listed above. For example, the data pertaining to the accumulator 20 may comprise a current state of charge of the accumulator 20 and/or a maximum state of charge of the accumulator 20. Further, the data pertaining to the accumulator 20 may comprise a desired state of charge of the accumulator 20. The desired state of charge may comprise an interval of states of charge. Determining S2 energy status of each of a plurality of local energy systems 30. The energy status of each of a plurality of local energy systems 30 is based on data pertaining to the respective local energy system 30. The determining S2 may involve pre-determined data pertaining to the respective local energy system 30. Hence, data that is known beforehand. The determining S2 may involve measured or estimated data pertaining to the respective local energy system 30. Hence, data that is changing over time. Examples of data pertaining to the respective local energy system 30 are listed above. For example, the data pertaining to each respective local energy system 30 may pertain to an amount of energy available for transfer to the accumulator 20 of the movable device 10 from the respective local energy system 30. Further, the data pertaining to each respective local energy system 30 may pertain to an energy needed of the respective local energy system 30. The data pertaining to the respective local energy system 30 may pertain to a time period of availability of the energy. Scoring S3 each of the local energy systems 30. The scoring is based on the determined accumulator status and the determined energy status for each of the local energy systems 30. The act of scoring S3 each of the local energy systems 30 may comprise estimating an energy cost for moving the movable device 10 to the respective local energy system 30. The act of moving the moveable device refers to transporting the moveable device to the respective local energy system. The act of moving may comprise one or more of driving, flying, propelling, or any other active way of transporting the moveable device to the respective local energy system. The data pertaining to the accumulator 20 may comprise a desired time of operation of the moveable device 10 comprising the accumulator 20. The desired time of operation may comprise a start time of the time of operation. The desired time of operation may comprise an end time of the time of operation. For example, for a moveable device 10, which is a surveillance drone, available energy from the local energy systems 30 may be weighed against the time when it expects to make its rounds. The data pertaining to the respective local energy system 30 may comprise a current movable device 10 occupancy capacity of the local energy system 30. Hence, if a local energy systems 30 may host a moveable device or not.

The scoring will result in a score for each of the plurality of local energy systems 30. The score may e.g. be on a scale from 1-10. Determining S4 a local energy system 30, among the plurality of local energy systems 30, to which the moveable device 10 is to be directed. The determining S4 is based on the respective scores of each of the plurality of local energy systems 30. For example, the determining S4 may be made by selecting the local energy system 30 having the highest score. The determining S4 may be made by selecting a local energy system 30 having a score above a threshold.

The method may further comprise directing S5 the moveable device 10 to the determined local energy system 30. The method may further comprise determining navigational data pertaining to the geographical position of the determined local energy system to which the movable device 10 is to be directed and to a current geographical position of the movable device 10. The act of directing S5 the movable device 10 may the comprise providing the navigational data to a navigator of the movable device 10.

The method may further comprise setting a geographical area to within which the movable device 10 is planning to move and determining the plurality of local energy systems 30 to be scored based on the geographical area and the geographical positions of the local energy systems 30.

The person skilled in the art realizes that the present invention by no means is limited to the preferred embodiments described above. On the contrary, many modifications and variations are possible within the scope of the appended claims.

For example, the moveable device 10 may for instance be something other than an electric vehicle, such as a small flying drone, an exo-skeleton or a submarine—it is possible to use any moveable device with an accumulator.

The movable device may also be autonomous.

In some embodiments the main task of the movable device is to be a movable accumulator for balancing excess and deficit of energy in local energy systems within a certain geographical area. An example of such a moveable device may be a vehicle comprising an accumulator in the form of a tank filled with a fluid. Energy may be stored in the fluid by heating the fluid. According to a non-limiting example, the fluid may be water or water mixed with an anti-freezing agent such as glycol. By this a simple and effective way for balancing excess and deficit of energy in thermal energy based local energy systems is provided.

Additionally, variations to the disclosed embodiments can be understood and effected by the skilled person in practicing the claimed invention, from a study of the drawings, the disclosure, and the appended claims.

The invention claimed is:

1. A method for handling surplus or deficit of energy in local energy systems, the method comprising:
   determining an accumulator status of an accumulator of a moveable device, wherein the accumulator status comprises a current state of charge of the accumulator together with a minimum, and/or a maximum state of charge of the accumulator;
   determining an energy status of each of a plurality of local energy systems, wherein the energy status of a first subset of the plurality of local energy system comprises an amount of energy available for transfer to the accumulator of the movable device from the respective local energy system together with a time period of availability of the energy, and wherein the energy status of a second subset of the plurality of local energy systems comprises an amount of energy needed at the respective local energy system together with a time period of the need of the energy;
   scoring, based on the determined accumulator status and the determined energy statuses, each of the local energy systems, wherein the scoring is configured to compare the energy status of the respective local energy system and the accumulator status of the accumulator of the moveable device; and
   determining, based on the respective scores of each of the plurality of local energy systems, a local energy system among the plurality of local energy systems to which the moveable device is to be directed.

2. The method according to claim 1, wherein the data pertaining to the accumulator comprises a desired state of charge of the accumulator.

3. The method according to claim 2, wherein the desired state of charge comprises an interval of states of charge.

4. The method according to claim 1, wherein the act of scoring each of the local energy systems comprises estimating an energy cost for moving the movable device to the respective local energy system.

5. The method according to claim 1, wherein the data pertaining to the accumulator comprises a desired time of operation of the moveable device.

6. The method according to claim 1, wherein the data pertaining to the respective local energy system comprises a current movable device occupancy capacity of the local energy system.

7. The method according to claim 1, further comprising directing the movable device to the determined local energy system.

8. The method according to claim 7, wherein each local energy system is associated with a geographical position, the method further comprising determining navigational data pertaining to the geographical position of the determined local energy system to which the movable device is to be directed and to a current geographical position of the movable device, and wherein the act of directing the movable device comprises providing the navigational data to a navigator of the movable device.

9. The method according to claim 1, wherein the local energy system comprises one or more of the following: a solar panel, a wind turbine, a thermal energy generator.

10. The method according to claim 1, wherein the local energy system comprises a moveable device comprising an accumulator.

11. The method according to claim 1, wherein the local energy system comprises one or more of the following: a district heating system, a district cooling system.

12. The method according to claim 1, wherein the local energy system comprises a shared heating and cooling thermal system.

13. The method according to claim 1, further comprising setting a geographical area to within which the movable device is planning to move and determining the plurality of local energy systems to be scored based on the geographical area and the geographical positions of the local energy systems.

14. The method according to claim 1, wherein the time period of availability of the energy is determined based on respective types of the energy corresponding to the respective local energy systems, wherein the time period of availability of the energy comprises at least one of a first-type time period of availability of the energy based on renewable energy and a second-type time period of availability of the energy based on fossil fuel energy, and wherein the first-type time period of availability of the energy is determined by referring to at least one of intensity information and weather forecast information of the renewable energy.

15. A server configured to handle surplus or deficit of energy in local energy systems, the server comprising:
- a receiver configured to receive a current state of charge of an accumulator of a moveable device together with a minimum and/or a maximum state of charge of the accumulator, and to receive, from a first subset among a plurality of local energy systems, an excess amount of energy available for transfer from each of the local energy systems of the first subset together with a time period of availability of the energy and, from a second subset among the plurality of local energy systems, an energy need of each of the local energy systems of the second subset together with a time period of the need of the energy, and
- a control circuit configured to:
  - determine, using an accumulator determining function, an accumulator status, wherein the accumulator status comprises a current state of charge of the accumulator together with a minimum, and/or a maximum state of charge of the accumulator;
  - determine, using a local energy system status determining function, an energy status of each of the local energy systems, wherein the energy status of a respective local energy system in the first subset comprises an amount of energy available for transfer to the accumulator of the movable device from the respective local energy system of the first subset together with a time period of availability of the energy, and wherein the energy status of a respective local energy system in the second subset comprises an amount of energy needed at the respective local energy system of the second subset together with a time period of the need of the energy;
  - score, using a guiding function, each of the plurality of local energy systems, wherein the score is a comparison of the respective energy status of the respective local energy systems and the accumulator status the accumulator of the moveable device; and
  - determine, using the guiding function, a local energy system among the plurality of local energy systems to which the moveable device is to be directed, wherein the determination is based on the respective scores of each of the plurality of local energy systems.

16. The method according to claim 14, wherein each of the local energy systems sets its corresponding desired SOCs of the moveable device only by admitting the desired SOCs to be charged to its corresponding levels by considering the maximum SOC of the moveable device and the weather forecast information.

\* \* \* \* \*